Aug. 10, 1965

E. L. MARTZ 3,199,931

EXTERNALLY PRESSURIZED FLUID BEARING

Filed May 7, 1963

EMMETT L. MARTZ,
*INVENTOR.*

BY

ATTORNEYS

Aug. 10, 1965

E. L. MARTZ 3,199,931

EXTERNALLY PRESSURIZED FLUID BEARING

Filed May 7, 1963

EMMETT L. MARTZ,
*INVENTOR.*

BY

ATTORNEYS

Aug. 10, 1965     E. L. MARTZ     3,199,931
EXTERNALLY PRESSURIZED FLUID BEARING

Filed May 7, 1963     5 Sheets-Sheet 4

EMMETT L. MARTZ,
*INVENTOR.*

BY

*ATTORNEYS*

EMMETT L. MARTZ,
INVENTOR.

United States Patent Office 3,199,931
Patented Aug. 10, 1965

3,199,931
EXTERNALLY PRESSURIZED FLUID BEARING
Emmett L. Martz, Huntsville, Ala., assignor to the United States of America as represented by the Administrator of the National Aeronautics and Space Administration
Filed May 7, 1963, Ser. No. 278,790
4 Claims. (Cl. 308—9)
(Granted under Title 35, U.S. Code (1952), sec. 266)

The invention described herein may be manufactured and used by or for the Government of the United States of America for governmental purposes without the payment of any royalties thereon or therefor.

The invention relates in general to a method and means of supplying fluid to the floating member of an externally pressurized fluid bearing.

More specifically, the invention relates to an improved air bearing in which a small volume of low pressurized air is employed as a lubricant between moving surfaces.

The invention is particularly applicable to the bearings of gyros operating in a high temperature and in fields of low gravity where high dimensional stability is mandatory, such as encountered in space flight vehicles.

In particular, the present invention is applicable to essentially common gyro assemblies wherein turbine torque will be substantially eliminated.

Present state of the art devices employ, in essence, two different types of "feeder" means, that is, means which supply the pressurized gas to the bearing area. These are: first, a plurality of separate feeder holes in the enclosing component for supplying the pressurized fluid, these holes being in the form of cylindrical bores; and second, annular gaps with parallel walls.

The major disadvantage of utilizing separate feeder holes is the creation of turbine torque imparted to the floated member by the pressurizing fluid. In many applications, and particularly those herein contemplated, such as highly miniaturized gyro devices for space vehicles, this torque is highly undesirable. For a typical thrust bearing employing separate orifices for metering air into externally pressurized gas lubricated bearings, on measuring the pressure tangentially over the orifices at the radius at which the center of the orifices are placed, a pressure distribution pattern having sharply defined "peaks" is obtained. Since, due to manufacturing imperfections it is virtually impossible to obtain a perfectly symmetrical pressure pattern for each orifice there will always be a resultant tangential air flow clockwise or counterclockwise and, therefore, a resultant turbine torque. Thus, turbine torque is caused by a nonsymmetrical tangential pressure distribution at some constant radius from the center of the floating member.

In the second type, i.e., annular gaps having parallel walls or an annulus for restricting and feeding the air, the gap is of constant width. All other factors remaining constant, the flow through such an annulus will vary as the width cubed. Ideally, if the air could be delivered in such a manner that the pressure at any given radius is constant, there would be no resultant tangential air flow and thus no turbine torque. This condition would appear to be approached by the continuous feeder slot since the pressure at any given radius is practically constant.

However, when the width is brought to a value small enough to give the low air flow necessary in many space applications, then the air emerges at such a high velocity that even minor tangential pressure gradients will cause an appreciable turbine torque.

Thus, it is readily seen that none of the above state of the art methods are entirely suitable.

The present invention overcomes these and other difficulties by the provision of an annular reservoir (or reservoirs) of constant pressure within the encircling members, and an annular restriction of constant width and constant length to restrict the fluid flow and thus create a pressure potential, and an enlarged annular slot of larger width than the restrictor and of constant length.

Other factors and many attendant advantages will become apparent when taken in conjunction with the following detailed description and drawings, in which.

Figure 1:
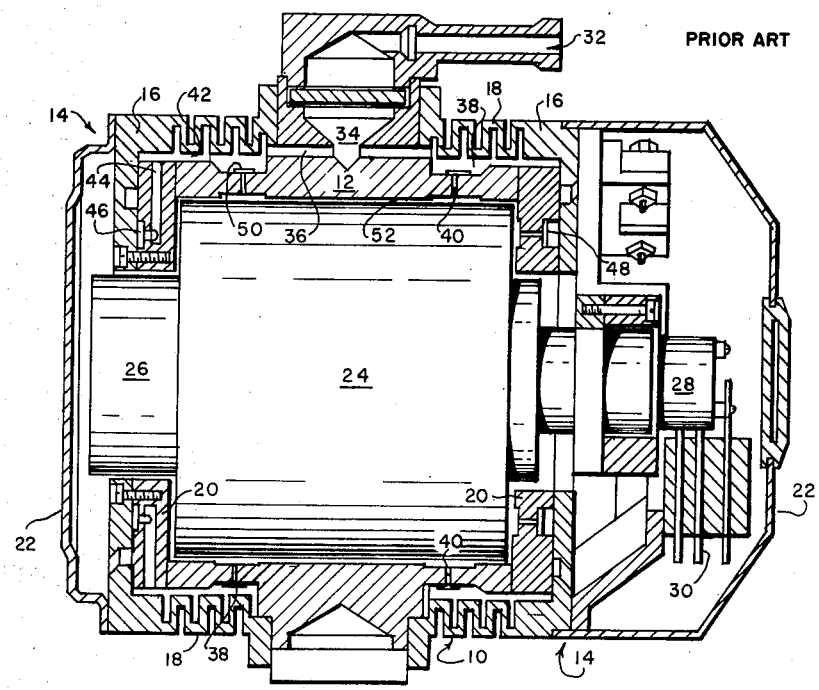
FIGURE 1 is a sectional, elevational view of a conventional air bearing gyro device.

Referring to FIGURE 1, there is shown a conventional air bearing gyro device comprising a housing 10, which housing is made up of a cylindrical sleeve 12 having removably attached thereto end assemblies 14, the end assemblies comprising closure plates 16 having relatively rigid bellows 18 integral therewith, which bellows permit proper tensioning between the end assemblies and the sleeve. End plates 20 are positioned between each closure plate 16 and sleeve element 12. On each end of the housing a dust cover 22 is removably secured to its corresponding end assembly 14. Inside the housing is mounted a conventional gyro enclosure 24 having shafts 26 and 28 extending outwardly therefrom, which shafts are journaled in and extend through the respective end assemblies 14. The shaft 28 is provided with leads 30 and conventional electrical contacts (not shown) for the operation of the gyro and housing 24.

Leading into sleeve 12 from a compressed air source (not shown) is a feed line 32 which communicates with a distribution and bearing plenum feeder 34. From this feeder, the compressed air flows through the passage 36 to the plenum chambers 38, in the embodiment herein shown as circumferential channels cast in the sleeve 12. Air is fed (a) for the journal bearings, directly to the sleeve bearing feeder orifice 40 and (b) for the end bearing, through the communication channels 42, 44 and 46 to the plenum chamber 48 in the end plates 20, which chambers are in offset relation to the communication channels 42, 44 and 46 as best seen by a comparison of the left and right sides of the illustration of FIGURE 1. The feeder orifice 40 is of course provided with restrictors 50, the restrictors providing a pressure differential. Following passage through orifices 40, air enters the cavity housing gyro enclosure 24 and acts as the lubrication film 52 between the gyro enclosure 24 and sleeve 12.

Figure 2:
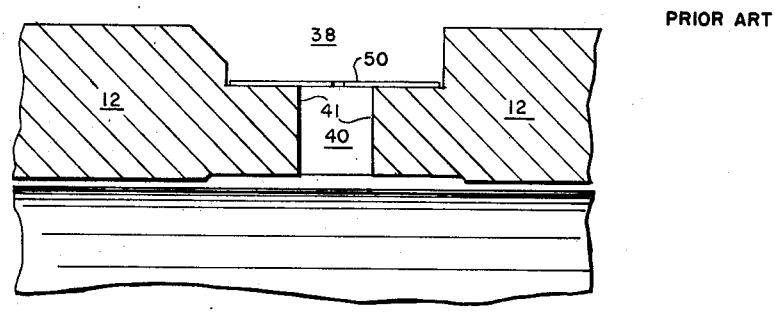
FIGURE 2 is a greatly enlarged detail sectional view of "state of the art" feeder orifices typical of the construction shown in FIGURE 1.

FIGURE 2 is a detail sectional view of "state of the art" feeder orifices typical of the construction shown in FIGURE 1. As is apparent from an inspection of this figure, sleeve 12 has on one side thereof a plenum chamber, herein designated 38, which plenum normally has formed therein feeder orifice 40 adjacent to a restrictor 50, the orifice 40 having essentially parallel walls 41 forming an inlet of substantially constant width, the inlet permitting entry of the lubricating gas to form a lubricating film 52 between the gyro enclosure 24 and sleeve 12.

As has been previously noted, such a device employing separate orifices will cause a pressure distribution pattern having pronounced peaks at the exits of each orifice. Due to manufacturing imperfections it is virtually impossible to obtain a perfectly symmetrical pressure pattern for each orifice. Consequently, there will invariably be a resultant tangential air flow between the enclosure and the supported member. This, of course, results in undesirable turbine torque.

Figure 3:
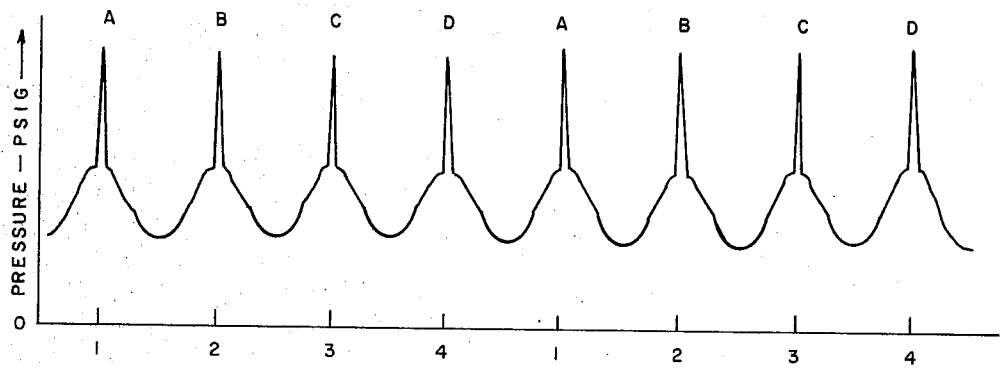
FIGURE 3 is representative of a pressure distribution curve for a thrust bearing employing the separate orifices of FIGURE 2.

The reason for this is clearly shown in FIGURE 3 for a typical thrust (end) bearing, wherein the pressure curve is plotted for each of the four orifices 1 through 4, such as those illustrated in FIGURES 1 and 2. As therein shown, the peaks A, B, C, D are sharply defined, and are of varying characteristics. As noted above, a perfectly symmetrical pressure pattern is virtually impossible to attain.

Figure 4:
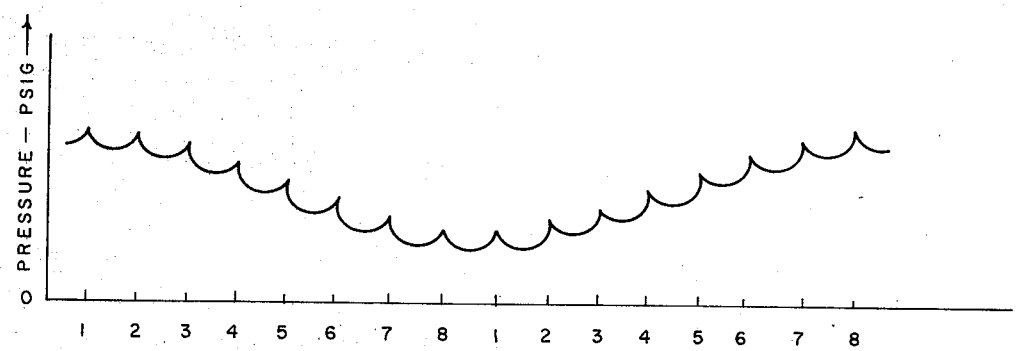
FIGURE 4 is a pressure distribution curve for a journal bearing using separate orifices.

FIGURE 4 is illustrative of a typical pressure distrtibution curve obtained in a journal bearing. Here the peaks corresponding to orifices 1 through 8 (as represented in the schematic drawing of a journal bearing in FIGURE 12) are formed or superimposed on the sine wave S-W. Obviously, in this instance since the air is being fed into an air gap which is constantly changing, as is readily apparent from an inspection of FIGURE 12, rather than on the flat surface of the thrust bearing, a tangential pressure gradient is invariably obtained which, of necessity, induces turbine torque.

Figure 5:
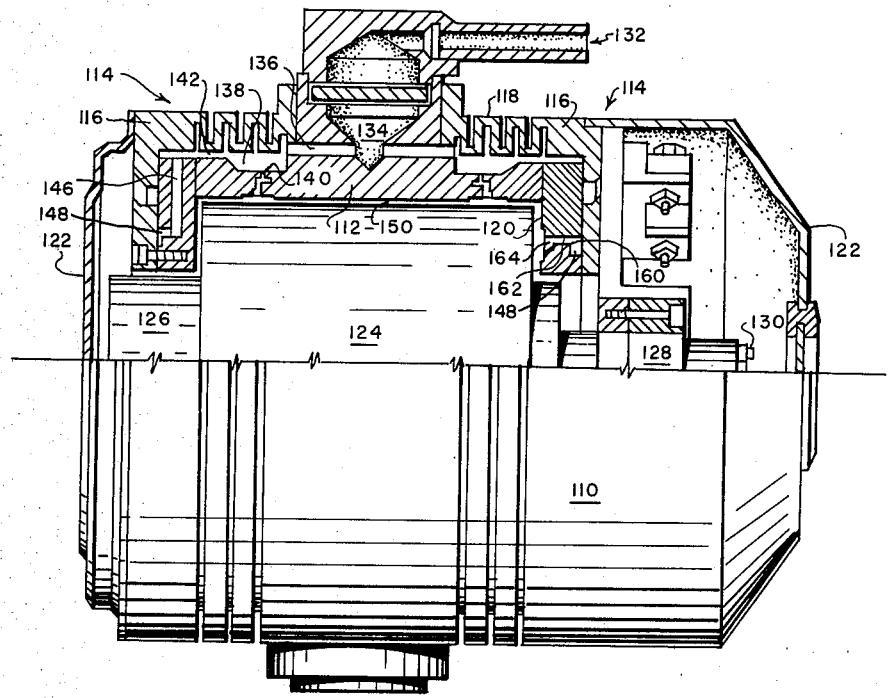
FIGURE 5 is a partial sectional view of an air bearing embodying the present invention.
Figures 6, 7:
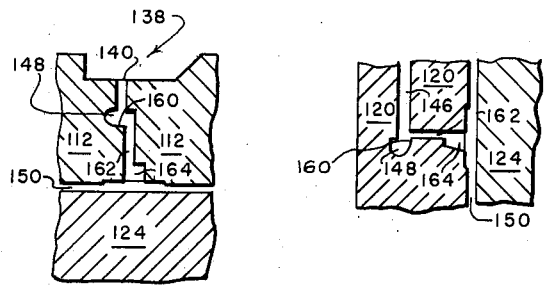
FIGURE 6 is a greatly enlarged detail sectional view of the feeder slots of FIGURE 5.
FIGURE 7 is a greatly enlarged sectional view of a modification of the slots of FIGURE 5.

Reference is now made to FIGURES 5, 6, and 7 which show an air bearing embodying the present invention, which substantially overcomes and eliminates the creating of the aforementioned turbine torque. FIGURE 5 is an elevational partial sectional view of an air bearing gyro device substantially similar in overall construction to that of FIGURE 1 with the exception of the feeder portion shown in enlarged sectional view in FIGURES 6 and 7. The device of FIGURE 5 comprises a housing 110 which has a cylindrical sleeve 112 having removably attached end assemblies 114, which assemblies in turn comprise closure plates 116 having bellows 118 integral therewith, as previously described. End plates 120 are positioned between each closure plate 116 and sleeve element 112. On each end of the housing a dust cover 122 is removably attached to its corresponding end assembly 114. Inside the housing is mounted a conventional gyro enclosure 124 having shafts 126 and 128 extending outwardly therefrom, shaft 128 being provided with conventional electrical leads 130 and contacts for the operation of the gyro and housing 124.

Leading into sleeve 112 from a compressed air source, feed line 132 communicates with distribution plenum 134, the compressed air then flowing through passage 136 to circumferential channels 138 in sleeve 112. The air is then fed (a) for the journal bearing, directly to the sleeve bearing feeder orifice 140 (FIGURE 6) and (b) for the thrust bearing through channels 142, 144 and 146, into annular reservoir 148 in end plates 120 which extend circumferentially around floated gyro member 124 and communicates with an annular restricting slot 160 associated with the annular gas feeding structure. The air then passes through feeder gap 162 to an enlarged slot 164 (see FIGURE 7), and lastly into the clearance gap 150 wherein it supports floated member 124.

Figure 8:
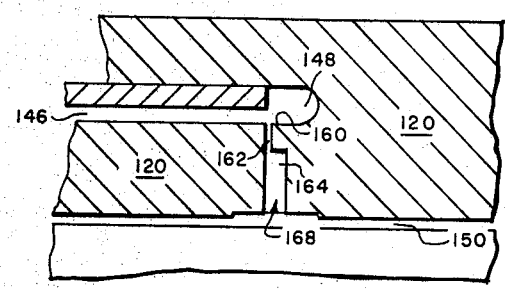
FIGURE 8 is a greatly enlarged sectional view of another modification of the slots of FIGURE 5.

FIGURE 8 shows one detail of a configuration embodying the present invention utilized in an end (thrust) bearing. Feeder channel 146 leads to an annular reservoir 148, on one side of which is formed an extended shoulder or restriction 160, which defines feeder gap 162 of diminished width. This gap or slot 162 then opens outwardly as at 164 to provide an enlarged feeder gap having an annular opening 168. In operation, air is fed to reservoir 148, restricted by slot 162 and then flows into feeder gap 164 where the velocity is reduced, then into gap 150 where it supports floated member 124. Annular slots 162, 164 are formed by concentric diameters to provide ease of manufacture. Slot 164 may have parallel walls, or may taper.

Figure 9:
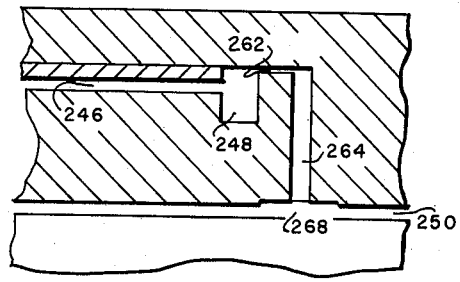
FIGURE 9 is an enlarged sectional view of a further modification of the slots of FIGURE 5.

FIGURE 9 is illustrative of another preferred embodiment utilized in an end (thrust) bearing. Feeder channel 246 communicates with reservoir 248, the air then being restricted at 262 and flowing into enlarged slot 264 through 268 into the floated member gap 250. In this embodiment, restricting gap 262 is formed between two flat surfaces and feeding slot 264 is formed between two concentric diameters.

Obviously many modifications and configurations are possible and will suggest themselves to those skilled in the art. Thus, rather than the one step between the restricting slot (162) and feeding slot (168), there may be a plurality of steps (not shown, but similar in overall operation to the "tapered" configuration illustrated). Other applications employing concentric diameters for the formation of the feeder slot are clearly possible and obtainable. The restricting means may be continuous or discontinuous, and may be readily formed by chemically etching, machining, lapping or other well known means to restrict the air flow. The only criteria is that a constant pressure over the feeding slot be obtained.

Although the drawings illustrate only one feeder slot, obviously any number may be employed to give the desired results.

Figure 10:
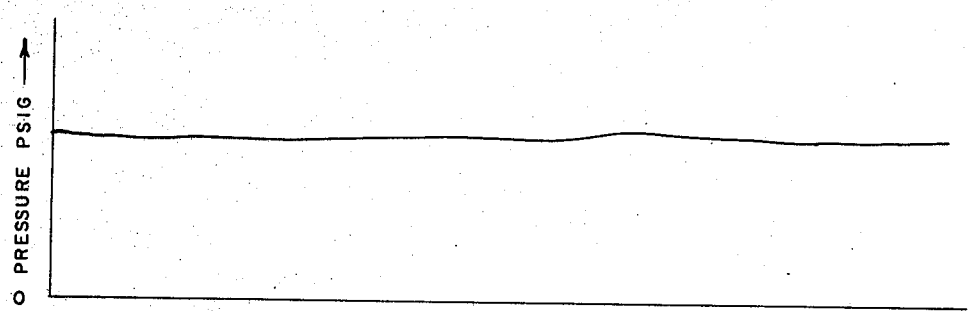
FIGURE 10 is representative of the pressure distribution curve for a thrust bearing using the continuous feeder slot of the present invention.

FIGURE 10 is illustrative of a typical pressure distribution curve for a thrust bearing embodying the present invention, that is, a continuous slot as set forth above. It will be noted that the pressure at any given radius is constant, and hence there can be no tangential flow resultant, and thus no turbine torque. Although the same general principle would apply to any continuous feeder slot, as noted previously it is virtually impossible to fabricate such devices to the necessary tolerances and accuracies requisite, and thus such a device without applicant's enlarged slot would, when small enough to have the required low air flow, have an emergent velocity at the mouth of the slot which would be so high that even minor tangential pressure gradients would cause appreciable turbine torque, as is apparent from the curve.

Figure 11:
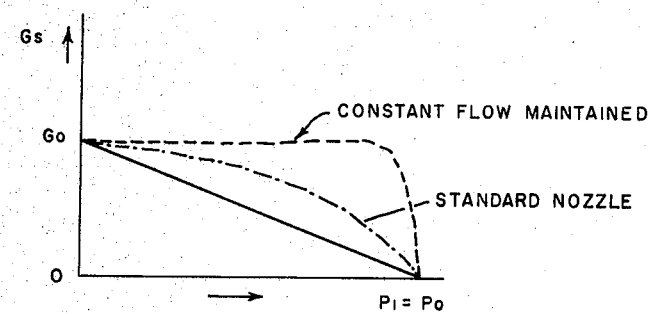
FIGURE 11 is the pressure-flow curve obtained by the present invention.

FIGURE 11 shows a typical pressure-flow curve obtained by the device of the present invention. The ordinate is representative of the weight of gas per unit of time $G_s$ (or flow) and the abscissa is representative of the pressure $p$. As is obvious from the curve, as the pressure $p$ increases, the flow decreases. This is of major importance in the applications to which the invention has its most successful current utilization in that, as the bearing is subjected to increasing accelerations, the clearance gap (such as 150 in FIGURE 5) in the thrust direction becomes smaller. Ordinarily, where a constant flow is maintained, as in the case of the prior art systems employing continuous feeder gaps, this causes an increase in the "back pressure" or pressure differential which increases the velocity of the gas passing through the orifices or feeder gaps. Obviously, this change in velocity in the clearance gap with changing gap has a pronounced effect in turbine torque. The pressure-flow curve for such a device is superimposed on FIGURE 11 and is represented by the dashed line. The pressure-flow curve for an orifice under the same circumstances is shown in FIGURE 11 by the dash-dot line.

Figure 12:
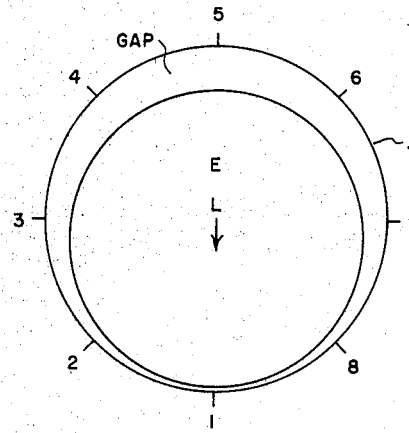
FIGURE 12 is a schematic representation of a journal bearing in cross section.
Figure 13:
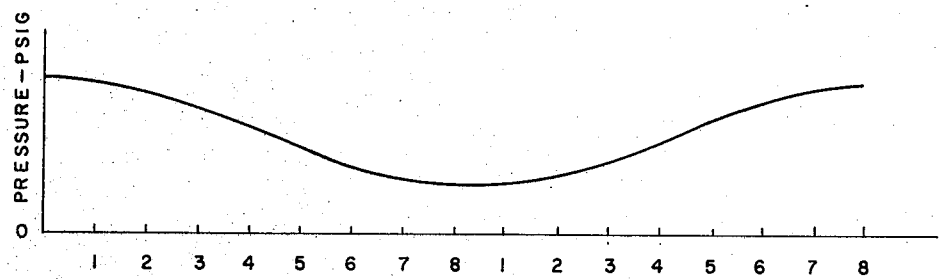
FIGURE 13 is a pressure distribution curve for a journal bearing using the annular slots of the present invention.

In FIGURE 12 is shown a schematic representation of a journal bearing in cross section. On such a bearing, the air is being fed directly into an air gap $g$ which is, obviously, continuously changing, as shown by the drawing. The interior of the outside member or sleeve is represented by S, and the floated member by E. The floated member E has a load L acting downwardly thereon, so that the gap is smallest at point 1. Naturally, the pressure is a maximum at point 1 and a minimum at point 5. Thus a pressure distribution curve for a journal bearing will assume the shape of a sine wave. Previously described FIGURE 4 shows such a curve where separate orifices are used, while FIGURE 13 shows a pressure distribution curve obtained where the annular feeding slot of the present invention is employed, the curve resultant therefrom being a substantially pure sine wave, which minimizes the creation of turbine torque.

It will thus be readily seen that the invention discloses a means whereby nonsymmetrical tangential pressure distribution and consequently turbine torque resultant therefrom, are substantially eliminated in both thrust and journal bearings. This result is achieved even where the ultrasmall dimensions requisite to miniaturized components and critical supply sources are not uniformly attained due to inherent manufacturing difficulties. Any nonconcentricity or out of roundness of such feeder slots, even though it causes such slots to have a nonuniform width, does not effect the bearing in that, since the pressure distribution is annular the tangential air flow caused by points of low pressure will be in both directions and thus have a cancelling effect one upon the other.

What is claimed is:

1. In an apparatus for supplying a lubricating film from a pressurized fluid source to a gap between two opposed contiguous bearing surfaces, one of a support member and one of a supported member, said supported member having an axis and moveable about said axis relative to a said support member, the combination comprising:
    (a) an annular reservoir within said support member extending around said axis;
    (b) a first communicating means for directing pressurized fluid from said source to said reservoir;
    (c) an annular fluid distribution slot in said support member extending around said axis and having an enlarged exit opening into said gap between said two opposed contiguous bearing surfaces;
    (d) a second communication means for directing said pressurized fluid from said reservoir to said fluid distribution slot;
    (e) restricting means in said second communication means for restricting the flow of said pressurized fluid from said reservoir to said enlarged exit opening into said gap between the supported member and the support member;
    (f) whereby the annular reservoir supplies pressurized fluid uniformly to said annular fluid distribution slot, said fluid flow is reduced by said restriction means, and the velocity of said fluid leaving said enlarged annular exit opening into said gap between said contiguous surfaces is reduced and uniform along said exit annular opening so that tangential pressure gradients along said annular exit opening is substantially zero thereby substantially eliminating turbine torque influences on said supported member.

2. The combination claimed in claim 1 wherein said restricted means is an annular slot with substantially parallel walls formed by concentric diameters.

3. The combination claimed in claim 2 wherein said annular fluid distribution slot has walls formed by concentric diameters.

4. In an apparatus for supplying a lubricating fluid from a pressurized fluid source to a gap between opposed contiguous bearing surfaces of a support member and a supported member, said supported member having an axis and moveable about said axis relative to said support member, the combination comprising:
    (a) a plurality of annular reservoirs within said support member extending around said axis;
    (b) a first communication means for directing pressurized fluid from said source to said reservoirs;
    (c) a plurality of annular fluid distribution slots extending around said axis, each of said slots having an enlarged annular exit opening in said support member bearing surface communicating with said gap between said contiguous bearing surfaces;
    (d) a second communication means for directing said pressurized fluid from said reservoirs to said fluid distribution slots;
    (e) restricting means in said second communication means for restricting the flow of the pressurized fluid from the reservoir to said enlarged annular exit opening;
    (f) whereby the annular reservoirs supply pressurized fluid uniformly to said annular fluid distribution slots, said fluid flow is reduced by said restriction means, and the velocity of said fluid leaving said enlarged annular exit opening into said gap between said contiguous surfaces is reduced and uniform along said exit annular opening so that tangential pressure gradients along said annular exit opening is substantially zero thereby substantially eliminating turbine torque influences on said supported member.

References Cited by the Examiner

UNITED STATES PATENTS

| | | | |
|---|---|---|---|
| 1,906,715 | 5/33 | Penick. | |
| 2,756,114 | 7/56 | Brunzel. | |
| 3,026,150 | 3/62 | Buckley et al. | 308—122 |
| 3,070,407 | 12/62 | Hughes | 308—9 |

DON A. WAITE, *Primary Examiner.*

FRANK SUSKO, ROBERT C. RIORDON, *Examiners.*